United States Patent [19]

Manker

[11] Patent Number: 4,872,442

[45] Date of Patent: Oct. 10, 1989

[54] ACTIVATOR FOR INITIATING REACTION IN A HEAT PACK AND METHOD FOR MAKING SAME

[75] Inventor: Charles F. Manker, Chicago, Ill.

[73] Assignee: Prism Technologies, Inc., Chicago, Ill.

[21] Appl. No.: 241,086

[22] Filed: Sep. 6, 1988

[51] Int. Cl.$^4$ .............................................. F24J 1/00
[52] U.S. Cl. ......................................... 126/263; 62/4; 428/596
[58] Field of Search .............. 126/263; 62/4; 422/245; 428/596

[56] References Cited

U.S. PATENT DOCUMENTS

| | | | |
|---|---|---|---|
| 2,220,329 | 11/1940 | Ham ..................................... | 126/263 |
| 4,077,390 | 3/1978 | Stanley et al. ....................... | 126/263 |
| 4,379,448 | 4/1983 | Kapralis et al. ..................... | 422/245 |
| 4,460,546 | 7/1984 | Kapralis et al. ..................... | 422/245 |
| 4,572,158 | 2/1986 | Fiedler ................................. | 126/263 |

*Primary Examiner*—Carroll B. Dority
*Attorney, Agent, or Firm*—Leydig, Voit & Mayer

[57] ABSTRACT

A highly reliable activator is provided for initiating the crystallization or destabilization of a super-cooled aqueous salt solution to cause generation of heat in a heat pack. The activator is characterized by a plurality of slits in a flexible metal article, with the opposing sides of the slits being in contact along at least a part of the length of the slit, and by an eroded and roughened surface on said article which comprises a number of minute metal nodules attached to and protruding from the surface, especially at or near the slit, which nodules are adapted to be detached or broken-off upon flexing of the activator. In addition the method of preparing said unique activator is provided which comprises tumbling said slit activators with an eroding material such as garnet powder to form the small nodules.

6 Claims, 1 Drawing Sheet

ACTIVATOR FOR INITIATING REACTION IN A HEAT PACK AND METHOD FOR MAKING SAME

BACKGROUND OF THE INVENTION

This invention relates to an improved, highly reliable activator capable of initiating the crystallization of a super-cooled aqueous salt solution contained within a flexible container, to thereby cause the contents to become hot and to form a heat pack.

In recent years there has been an increasing interest in the provision of heat packs which utilize a super-coolable aqueous salt solution that can be activated to liberate heat but is also rechargeable and re-usable many times. Such heat packs have significant advantages over former means such as a hot water bottle or a heated electric element because of their portability and performance upon a moments notice without the need for a supply of hot water or electricity to generate the heat. A super-cooled heat pack in its liquid state can be transported readily and is always available on a moments notice to provide localized heat, as for the relief of pain and soreness in parts of the human body. Heat packs are becoming more popular with the growing population of persons who engage in exercise, athletes, and sportsmen, and are particularly useful in hospitals, clinics and in the home for the convenient generation of localized heat to provide relief to the patient.

Prior art devices were described as early as 1978, such as in U.S. Pat. No. 4,077,390, which describes a flexible container filled with a super-cooled aqueous salt solution and also containing a flexible ferrous metal strip characterized by one or more fissures or slits which are said to initiate crystallization of the solution when the metal strip is flexed. The fissure or slit is so prepared that the opposing sides of the fissure do not touch or scrape one another but ultimately taper to and terminate in a blind end. The patentee expresses his belief that the flexing of the metal piece produces minute continuances or extensons of fracturing of the metal at the blind end of the slit, and that these new fractures are instrumental in initiating crystallization. While the patentee calls for a ferrous metal strip he actually specifies stainless steel as the metal.

Heat packs made in accordance with the teachings of U.S. Pat. No. 4,077,390 prove to have serious drawbacks in practical use. The continual bending to initiate crystallization can create a break in the activator strip along the lines of the slits or cuts. Once broken the effectiveness is lost and the heat pack becomes unusable. Furthermore, the broken metal can cause a puncture in the heat pack and undesirable leakage of the salt solution.

Of even greater disadvantage is the fact that the activator strip is not wholly reliable to cause an activation of the crystallization. In such case the flexing of the metal strip fails to activate a reaction, even after many flexings. It can be seen quite readily that failure of only a small percentage of the heat packs to achieve initiation is certain to cause a loss of confidence in the unit and resulting lack of continuing repeat sales. The disappointed user very likely will return the failed heat pack for a refund with resulting loss to the manufacturer. Something approaching 100% reliability on the part of the activator strip to initiate crystallization is a virtual necessity for success in the marketing and use of the pack.

U.S. Pat. No. 4,379,448 recognized the shortcomings of the aforesaid heat pack and attempted to modify the problem by placing slits on the inside of the trigger with none of them extending to the marginal edges of the strip. Further, the patentee employs the concept of a snap-displacement of the metal, the so-called "oil can" effect when the metal is subjected to flexing or bending.

Once again the heat pack failed to perform with sufficient reliability in actual use since there was a percentage of the units which failed to activate despite any amount of flexing of the metal part. The same patentee tried an alternative construction in U.S. Pat. No. 4,460,546 wherein he introduced pinhole openings in the metal strip in place of the fissures or slits shown in his previous patent. This patentee introduced a non-ferrous metallic strip of a Berylium-copper alloy or phosphor-bronze, in order to avoid the deficiencies of the stainless steel trigger employed in earlier constructions. Heat packs made in this way likewise still were not completely satisfacotry. The "oil-can" effect can result in snap-deflection accidentally if the heat pack is handled too roughly. In other instances no amount of bending or snap action can cause the activation of the contents of the heat pack.

Still another attempt was made in U.S. Pat. No. 4,572,158 to resolve the problem of failures by making a least one major cut extending completely through the metal part and positioned totally within the exterior perimeter thereof, and making the slit wide enough so that the opposed facing edges are always spaced one from the other. Then the patentee made a second minor slit at one end or the other of the major slit and at an angle to the major slit. Again the minor slit is formed with two opposing facing edges that are minutely spaced one from the other so that they do not touch during manipulation. This patent also employed the snap displacement or "oil-can" effect.

The patentee explained his theory that the actual triggering or starting of the crystallization reaction is caused by the exposure of a new metal surface to the solution. His configuration is said to utilize the minute tearing of the metal surface at the end of the minor slits during flexing to thereby expose new metal to the solution and initiate crystallization. This arrangement has not proved to solve the ultimate problems of failures because in at least a significant percentage of the units repeated flexing is never successful in initiating the crystallization, or it my work one or a few times but then unaccountably fails to respond to flexing.

It should also be recognized that the attempt to exert quality control on the manufacture of the activator strips is a very costly and time consuming activity because of the minute size of the cuts and further because it is not possible to properly test the activator without putting it in a super-cooled salt solution and flexing it to see if activation actually occurs. Quality control after the heat packs have been assembled is also very expensive and never quite 100% satisfactory because an activator may work satisfactorily once or twice and then fail. To carry out the quality control to this level of testing requires repeated crystallization and melting, which requires the expenditure of much time and labor.

Thus, until the present invention was made the problem of unreliable activation of crystallization in heat packs still persisted and has had an inhibiting effect on the use of such units.

SUMMARY OF THE INVENTION

It is a principal object and contribution of this invention to provide an activator (trigger) and method for making it, which is capable of reliably initiating the crystallization reaction of a super-cooled aqueous salt solution contained within a flexible heat pack, to start an exothermic reaction which generates heat in the pack. The activator preferrably is a thin metal piece having one or more slits wherein the opposing sides have been forced into contact with each other, and a roughened surface and is encased, along with the super-coled solution, within a flexible, relatively thin plastic pouch so that the activator may be flexed by an operator's fingers. Such flexing is believed to cause a metal-to-metal contact between the adjacent sides to release one or more minute particles of metal from the roughened surface which acts as a nesting site for a crystal deposited from the solution, thereby destablizing the solution and causing it to progress rapidly from the liquid to crystalline state with resultant generation of heat.

The activator of this invention is unique in that it has roughened surfaces which, under high magnification shows the presence of a multitude of tiny particles or nodules of the metal protruding from the surface but attached thereto especially adjacent to the sides of the slits, as depicted graphically in the accompanying drawing. To the naked eye the roughened surface has a dull appearance.

When the roughened activator is flexed, it is believed that one or more of the nodules breaks off, dislodges or detaches from or adjacent to the edges of the slits therein, and becomes a starting site for a crystal which begins to form from the now destablized super-cooled solution. While it is believed that this explanation of the function of the invention is correct, it should be understood that this explanation is offered to assist in an understanding of a reason for the ultimate result but is not intended to constitute a limitation. It is the achievement of the desired result that is important and not any particular explanation or theory of how the result may have occurred.

Roughening the surface of the activator to provide the detachable minute nodules at or near the slit edges described above is accomplished, as a part of this invention, preferably by tumbling the activator in a precise manner, using a medium that has hard, sharp edges capable of scoring or eroding the metal surface of the activator to form a multitude of irregularly shaped minute particles or nodules which normally are attached to the body thereof but which are adapted to be dislodged, detached or broken off upon flexing of the thin activator.

Tumbling involves agitating a plurality of the small activator pieces in contact with the aforesaid medium such as a garnet powder or especially hard silica sand to effect a scratching, scoring or eroding of the metal surface until the desired detachable nodules are formed. Optionally a number of inert, irregularly shaped objects may be introduced into the agitating mass to assist in causing eroding contact between the sharp medium and the metal activator. Tumbling is continued until the metal surface takes on a dull finish which, under high magnification, is indicative of the presence of the desired detachable nodules.

The advantages of the invention will become more apparent upon consideration of the further details and the drawing, which are intended to provide a more complete description of preferred embodiments, without intending to limit the scope of the invention.

BRIEF DESCRIPTION OF THE DRAWINGS

The drawings are included to provide a graphic illustration of what it is believed that one would see when viewing a tumbled activator under high magnification. The drawings are not intended to be drawn to any scale but rather to depict the presence of the minute, detachable irregularly shaped nodules formed on the surface of the activator during the tumbling operation.

DETAILED DESCRIPTION OF THE INVENTION

I have found after years of experience with thousands of heat packs, and after substantial study and experimentation, that the above described theories of operation of the activators never fully explain the persistant problem of failures. No matter which of the numerous prior art designs for activators I investigated, there always were failures. Extensive effort at quality control was never able to achieve the necessary degree of reliability.

The snap-action activator, the fissure or slit, whether the opposing sides are open or only slightly touch, and whether the slit extended through the perimeter of the metal piece, all proved on extensive test to be less than satisfactory. Likewise, whether stainless steel or alloys were used as stock for the activator, the problem of failures persisted. The theory of exposure of new metal to the solution was not the answer, either because it was wrong or because flexing occasionally failed to expose new metal. Compression of the solution between the edges of the slits due to the "oil-can" effect likewise failed an unacceptable number of times.

After much study and experimentation I have now achieved the manufacture of a metal activator which has the requisite degree of reliability.

It is possible by following the description of this invention to make activators which are virtually 100% reliable upon use in heat packs, and which avoid many of the difficulties which have led to unreliability in prior activators and to increased costs both for manufacture and for quality control.

Figure 1:
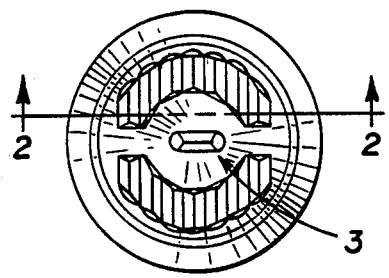
FIG. 1 is a somewhat enlarged top plan view of one of the preferred forms of the subject activator and FIG. 2 is an enlarged cross-sectional view taken along the line 2—2 in FIG. 1.
Figure 2:

Referring to the drawings, there is depicted an important feature of the invention. In FIGS. 1 and 2 a preferred form of activator 10 is illustrated as formed from a thin strip of metal, generally circular in shape and slightly dished. One slit 11 is cut through the center of the disc but not extending to the perimeter. A number of small slits 12 are cut essentially at right angles to the center slit 11. In the process to be described later in greater detail, the slits 11 and 12 are cut by a sharp die and thereafter are pressed back toward a flat configuration with the opposed edges of the slits closed. Positioning the cut opposed edges of the slits together creates greater friction during flexing and desirably improves the ability to detach a nodule or minute fleck of metal to initiate crystallization.

Figure 3:
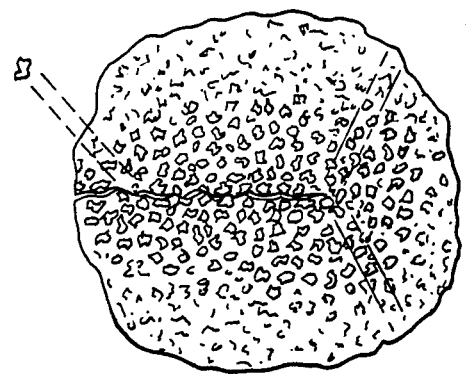
FIG. 3 is a greatly enlarged graphically illustrative top view of a portion of the surface of the activator shown in FIG. 1.

In FIG. 3 there is depicted graphically a greatly enlarged portion of the surface of the disc 10, as indicated by the arrow 3 shown in FIG. 1, as though seen under high magnification, and illustrative of my belief as to the condition of the activator after tumbling. The slit 11 is seen for illustrative purposes with opposing edges shown substantially in contact, though in actual practice the slit may not be closed along its entire length. A multitude of nodules 13 are shown adjacent the slit 11, each nodule being of irregular shape and size but detachably adhering to the surface of the disc 10. Upon flexing of the disc I believe one or more of the nodules, usually those near the slit, becomes dislodged or detached due to contact between the sides of the slits and is free to float around in the super-cooled solution in the heat pack, as illustrated by nodule 14 in the dotted line path of movement. Such a free particle or nodule immediately becomes a site for the formation of a crystal deposited from the solution, and complete crystallization follows rapidly in due course.

In the preparation of one preferred model of the activator, a strip of metal such as stainless steel approximately 1" wide and between about 3 mills to about 10 mills in thickness is fed into a track where it passes first between a pair of dies mounted for movement in a press and wherein the dies move to engage the metal strip. One of the dies has a number of sharp protuburances which are adapted to correspond with a similar number of depressions in the face of a female die so that, as the metal strip passes between and is engaged by the dies a number of cuts are made in the metal corresponding to the slits 11 and 12 shown in FIG. 1. After the cuts are made the dies retract and the metal strip passes to another work station where it passes between a set of flat dies which close sharply on the strip to essentially flatten the cut portion to a position wherein the opposing sides of the slit are forced into contact with one another.

Then if desired the metal strip may pass between a set of dies which imparts a dish shaped configuration to the metal. This latter step is not necessary to the successful manufacture of highly reliable activators, but is somewhat preferred.

Finally, the metal strip passes beneath a cutting die and an appropriately shaped female die, whereupon the male die descends upon and cuts out the piece of metal which has been subjected to the slit cutting operation. The cut outpiece is in the configuration shown in FIG. 1, but it should be understood that the exact shape is not of vital importance and it may be round, oval, square or rectangular.

The tumbling operation consists of placing a large number of the activator pieces into a rotating barrel or drum. The drum is preferably prepared with a rubber lining having ribs or fins on the inside and designed to create a maximum amount of agitation of the contents when the drum is rotated. Typically the drum is filled about 70% full of material to be tumbled. About half of the material is garnet powder, hard silica sand, aluminum oxide or other small grained, hard and sharp media capable of eroding a metal as hard as stainless steel. About one-quarter of the material is the subject metal activators and the remainder is a larger inert media. Garnet powder of approximately 36 mesh is suitable and large ceramic star shaped or tubular shaped inert objects are added to enhance the turbulance during the tumbling operation. Ceramic media of the type known in the trade as EXC 78 T is suitable. I have found, however, that many of the well known tumbling media fail to provide sufficient erosion of the metal. The size of the eroding media can be varied somewhat from the 36 mesh size of the garnet powder and the ultimately size to be chosen will depend upon the metal to be eroded and the degree of erosion that is desired in the finished piece.

After the drum is loaded it is closed and rotated at an angle to the vertical for typically 45 minutes and until the metal activators have assumed a dull finish which is indicative of a properly eroded surface which, upon large magnification, would show the presence of the desired nodules or particles attached to the surface of the disk but capable of being detached by flexing thereof.

While the operation has been described above in reference to the use of stainless steel as the metal, it will be understood that other suitable metals can be employed such as a Berylium-copper alloy or phosphor-bronze. The size and shape and thickness of the metal activator may be varied as desired so long as the resulting activator is flexible and does not introduce undesirable disadvantages such as a sharp cutting edge which may cause destruction or a leak in the flexible plastic pouch which constitutes the exterior of the heat pack. As noted above the activator may be flat, dished, or of the "oil-can" configuration that will spring back in a snap action when it is flexed. Also, contrary to the teachings of several of the prior art patents, it is not important that there be an opening between the opposed faces of the slits. Instead, preferably the opposed faces of the slits touch for at least a substantial portion of their length, thereby to assist in breaking off the nodules when the activator is flexed.

When activators are made in accordance with the above directions, they approach 100% reliability as triggers to initiate the crystallization of the super-cooled aqueous salt solution contained within the heat pack. I have found that the closed slit design described herein is vital to this degree of reliability and, if the activators are not tumbled and eroded as disclosed herein an undesirable or unacceptable percentage of them fail to initiate the crystallization despite any amount of flexing.

Since the configuration of the slits in the face of the activator has proven not be of critical importance so long as the sides are urged back into substantial contact, it now becomes possible to use cutting dies of somewhat less precise design, and to run them substantially longer than can be done when it is required to make the slits of the precision that was required of the prior art activators. This results in less expensive dies and longer production runs without changing dies, with the resulting economies and a lower cost activator.

Further, it has been found that, employing the activators of ths invention, it is possible to activate or initiate the crystallization reaction in a super-cooled aqueous salt solution of lower concentration of the salt than has been possible with the prior art activators. This is important because the ultimate temperature achieved in a heat pack depends on the concentration of the salt, such as sodium acetate, in water, with the higher concentration of salt resulting in a higher temperature. For many uses a heat pack which generates a lower temperature is desirable in order to avoid overheating the skin and other disadvantages.

With prior art activators it has been necessary to employ a higher concentration of salt which results in a heat pack having a temperature of about 130° F., with the attendant undesirable results. Using the prior art activators it is very difficult or impossible to achieve reliable activation employing a concentration of salt low enough to result in an ultimate temperature not exceeding 110° F., whereas salt solutions capable of that ultimate temperature are readily activated using the actuator of this invention. As a result, by the use of the activator of this invention, a substantial saving in the amount of the salt is achieved in making lower concentration solution, and a lower temperature heat pack is achieved.

It will be apparent to those skilled in this art that various changes may be made in the construction and form of the activators and in the details of the method of manufacture without departing from the spirit and scope of this invention, and that the specific directions and forms shown herein are presented for the purpose of making an understandable disclosure of the invention and are not intended to be any restriction on the scope thereof, other than as defined in the accompanying claims.

I claim as my invention:

1. An activator for reliably initiating crystallization of a super-cooled aqueous salt solution, said activator being formed of a flexible, relatively thin metal, having at least one slit extending therethrough and with the opposing sides of said slit being in contact along at least a part of the length of said slit, and said activator having a number of minute metal nodules attached to and protruding from the surface thereof and adjacent to said slit, said nodules being adapted to be detached from said surface upon flexing of said activator.

2. The activator of claim 1 wherein the metal is stainless steel, Berylium-copper alloy or phosphor-bronze alloy.

3. The activator of claim 1 wherein the opposed edges of said slit have been cut and then forced back into contact with one another.

4. The method of making a flexible metal activator for use in initiating crystallization of a super-cooled aqueous salt solution carried within a sealed flexible container, said method comprising the steps of
forming a relatively thin metal activator, forming at least one slit through a portion of the surface of said activator and,
urging the opposing sides of said slit into substantial contact with each other, and
tumbling said activator in a rotating drum in contact with a multitude of irregularly shaped, hard, sharp edged, small particles of a material capable of abrading or scoring the surface of the activator to thereby form on said surface a number of minute metal nodules protruding therefrom, at least a portion of said nodules being adapted to be detached from said surface upon flexing of said activator.

5. The method of claim 4 wherein the abrading material is a garnet powder or a blonde silica sand.

6. The method of initiating crystallization of a supercoolable aqueous salt solution carried within a sealed flexible container, said method comprising the steps of
introducing a relatively thin flexible metal activator into said super-coolable solution, said activator having at least one slit in the surface thereof the opposing sides of which are in substantial contact with each other, and having a multitude of minute metal nodules protruding from the surface thereof adjacent to the opposed edges of said slit and adapted to be detached from said surface upon flexing of said activator,
and flexing said activator within said flexible container to thereby displace one or more of said metal nodules from the surface of said object, thereby initiating crystallization of said super-cooled solution.

* * * * *